United States Patent Office

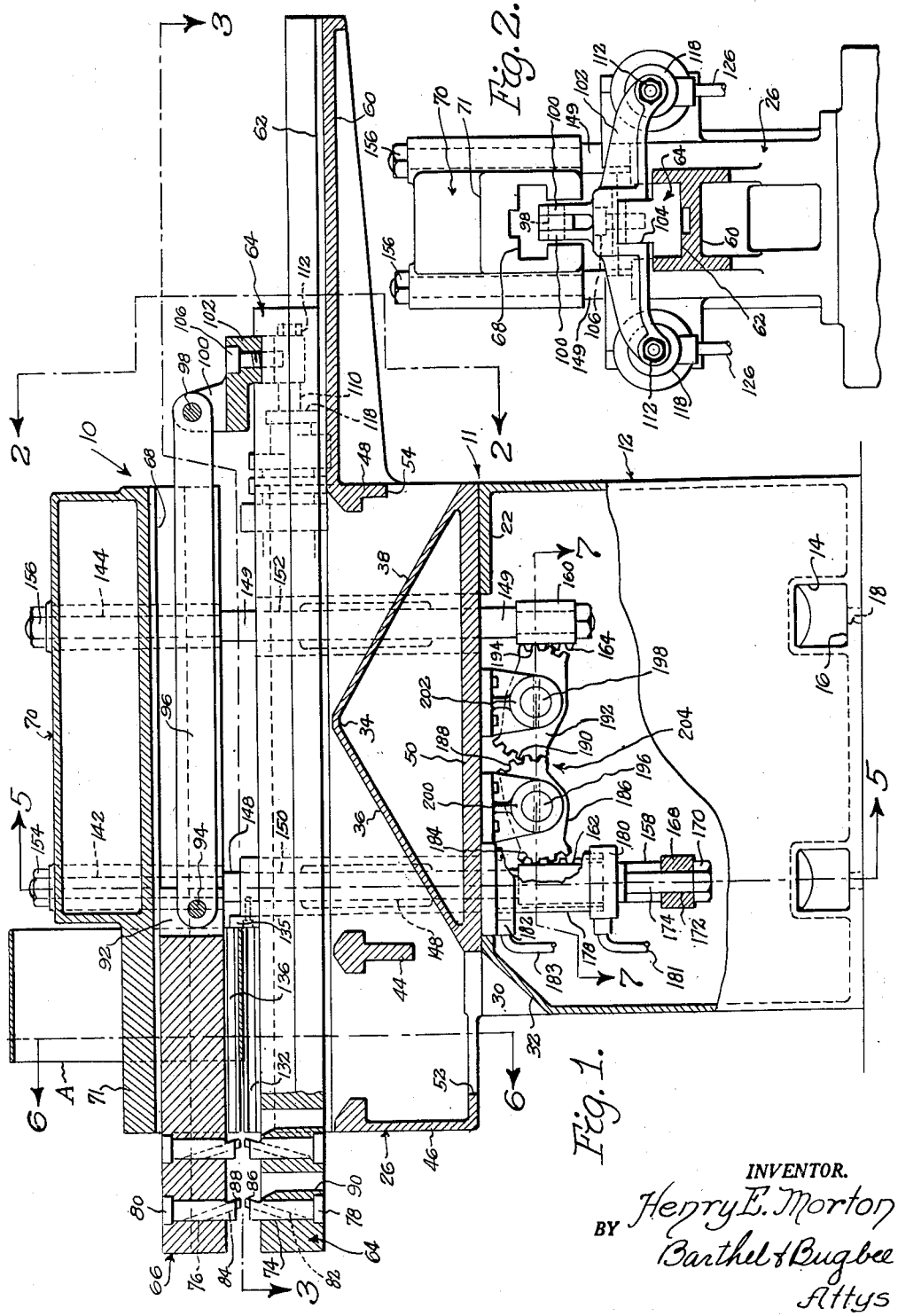

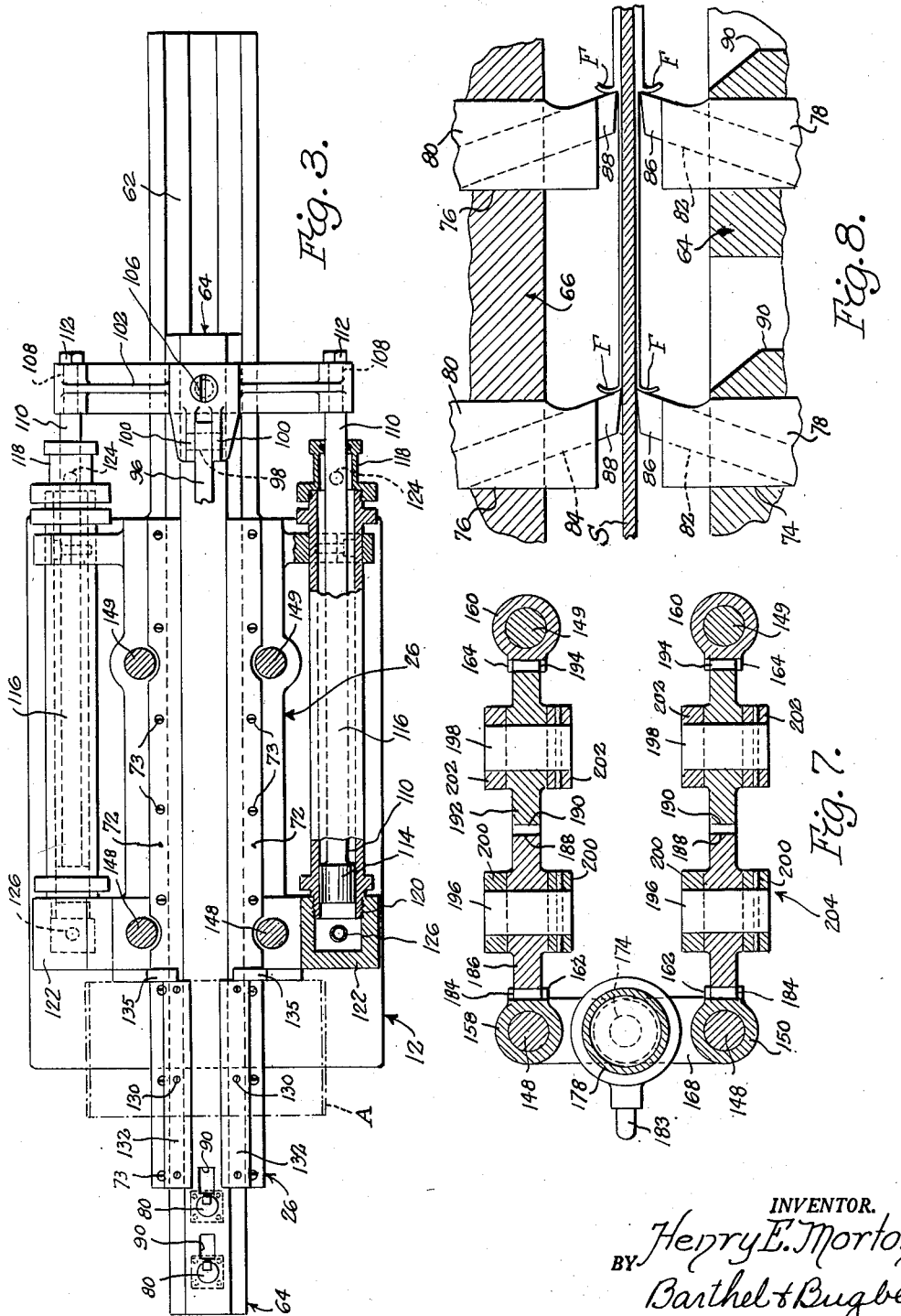

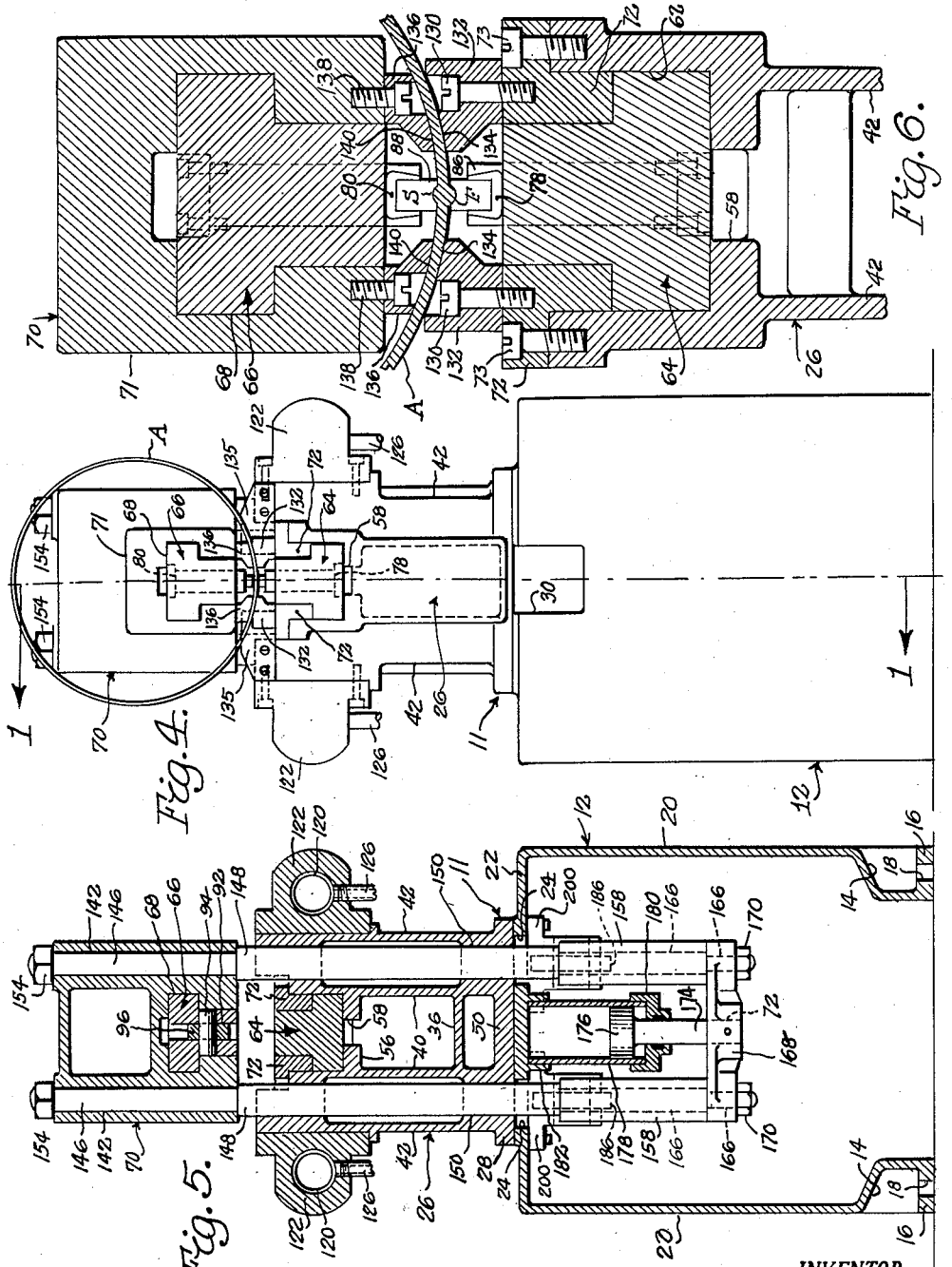

2,781,698
Patented Feb. 19, 1957

2,781,698

FLASH TRIMMING MACHINE

Henry E. Morton, Muskegon Heights, Mich.

Application August 3, 1953, Serial No. 371,783

8 Claims. (Cl. 90—38)

This invention relates to flash trimming machines for removing the flash or excess of welding metal at the joint between welded metal sheets or strips.

One object of this invention is to provide a flash trimming machine for rapidly and efficiently removing the flash from an open-centered article which has been formed by welding together the opposite ends of a sheet or strip of metal, such as, for example, an automobile tire rim, and at the same time requiring the minimum amount of manipulation of the article in transferring it from the welding machine to the flash trimming machine and from the latter to other subsequently used machines.

Another object is to provide a flash trimming machine of the foregoing character for an open-centered welded sheet metal article wherein the article is located and clamped in an upstanding position while resting upon a stationary support beneath it and clamped from above, rather than suspended or held in a depending position while clamped from below, as in prior flash trimming machines, thereby eliminating a number of manipulating or positioning operations hitherto required before and after transferring the article to and from the flash trimming machine.

Another object is to provide a flash trimming machine of the foregoing character for an open-centered welded sheet metal article which will fit into a line-up of automatic welding, conveying and edge-trimming machine without requiring inversion of the article from one machine to another, so that the article is maintained substantially in the same position throughout its passage from one machine to another in the line-up of machines.

Another object is to provide a flash trimming machine of the foregoing character for an open-centered welded sheet metal article, wherein the article is clamped in a predetermined position or orientation and is maintained in registry with such orientation during its passage through the line-up of machines.

Other objects and advantages will become apparent during the course of the following description of the accompanying drawings, wherein:

Figure 1 is a central vertical section through a flash trimming machine for open-centered welded sheet metal articles, taken along the line 1—1 in Figure 4;

Figure 2 is a vertical section, mainly a right-hand-end elevation, taken along the line 2—2 in Figure 1;

Figure 3 is a horizontal section taken along the line 3—3 in Figure 1;

Figure 4 is a left-hand end elevation of the machine shown in Figure 1;

Figure 5 is a vertical cross-section taken along the line 5—5 in Figure 1, showing details of the work-clamping mechanism;

Figure 6 is an enlarged vertical cross-section taken along the line 6—6 in Figure 1, showing details of the cutting rams and cutting tools in removing the glass;

Figure 7 is a horizontal section taken along the line 7—7 in Figure 1, showing details of the clamping equalizer mechanism; and Figure 8 is an enlarged fragmentary central vertical section substantially constituting an enlarged view of the left-hand end portion of Figure 1, showing the action of the flash trimming tools in simultaneously trimming the flash on the upper and lower sides of the welded seam of the article.

Hitherto, in the manufacture of open-centered welded sheet metal articles, such as automobile tire rims, an elongated strip of sheet metal has been bent into cylindrical shape and its opposite ends welded together along a seam, the article being held in an upstanding position while being welded. The open-centered cylindrical sheet metal article thus formed has been then transferred to a flash trimming machine, where it has been placed upon a lower horn in a depending or hanging position, with the major portion of the rim suspended below the horn. After the flash has been removed, the operator then has to transfer the article from the flash trimming machine to an edge trimming machine having an action similar to a punch press, in the meantime further altering the position of the article from that which it occupied when originally placed in the welding machine.

The flash trimming machine of the present invention receives the welded article in the same position or orientation which it occupied in the welding machine, and transfers it to the edge trimming machine in the same position of orientation, maintaining an accurate registry of the welded seam throughout the manufacturing operations and thereby enabling the latter to be placed upon a continuous automatic production basis without inversion or other alteration of the position of the article during the sequence of production occupations.

*Frame and base construction*

Referring to the drawings in detail, Figures 1 to 5 inclusive show a flash trimming machine, generally designated 10, for open-centered welded sheet metal articles A having around its center opening a continuous rim closed by a welded seam S with flash F or excess welding metal (Figure 6) which it is desired to remove. The machine 10 consists of an upright frame structure, generally designated 11, including a hollow base, generally designated 12, of box-like form with bottom side recesses 14 providing holddown lugs 16 (Figures 1 and 5) which are drilled as at 18 to receive holddown bolts (not shown) by which the machine is secured to the floor or foundation on which it is mounted. The base 12 is provided with side walls 20 and a top wall 22 with a central rectangular aperture 24. Mounted on the top wall 22 and supported by the hollow base 12 is an intermediate supporting structure, generally designated 26, also forming a part of the frame structure 11 and having a bottom edge flange 28 resting upon the top wall 22 of the base 12 (Figure 5) and extending upwardly therefrom. The base 12 at one end is provided with a recess 30 adjacent the top wall 22 and having an inclined ramp 32 leading downwardly for ejection of chips by gravity.

Cooperating with the inclined ramp 32 is a double inclined internal ramp 34 (Figure 1) having oppositely-inclined bottom walls 36 and 38 for guiding downwardly the chips of flash removed during the cutting operation and forming the central internal portion of the intermediate supporting structure 26. The structure 26 has inner side walls 40 extending upwardly from the ramps 36 and 38 and outer side walls 42 spaced outwardly therefrom (Figure 5), these being interconnected by a cross member 44 integral therewith and by opposite end members 46 and 48, also integral therewith. The structure 26 is provided with a bottom wall 50 resting upon the top wall 22 of the base 12 and interconnecting the side walls 40, 42 and end walls 46, 48, and has an aperture 52 immediately above the recess 32 for the ejection of chips as well as for access to the internal mechanism. For a similar purpose, the end wall 48 is also provided with an aperture 54 (Figure 1). The intermediate supporting structure 26 has a top wall 56 with a central aperture 58 (Figure 5) and an extension 60 projecting outwardly from the end wall 48 (Figure 1). The top wall 56, including its extension 60, is provided with a trough-shaped guideway 62 for receiving the lower cutting ram, generally designated 64, and guiding it in its reciprocation, along with the upper cutting ram, generally designated 66, as subsequently explained below.

Cutting ram construction

The upper cutting ram 66 is reciprocably mounted in an elongated trough-like guideway 68 (Figure 5) of T-shaped cross-section formed in a hollow head structure, generally designated 70. The latter is superimposed upon the intermediate structures 26 so as to be movable vertically relatively thereto and has a forward extension 71 (Figure 1). The cutting rams 64 and 66 are in the form of elongated blocks of T-shaped cross-section accurately yet slidably fitting their respective guideways 62 and 68 respectively. The smaller width portions of the lower and upper cutting rams 64 and 66 face upwardly and downwardly respectively so as to face one another. In order to further guide the lower cutting ram 64 in its reciprocation, as well as to facilitate removal thereof, a pair of wear members or guide bars 72 is mounted in the upper portion of the guideway 62 (Figure 5), overhanging the broader width lower portion of the lower cutting ram 64 and bolted as at 73 to the top of the intermediate structure 26.

Each of the cutting rams 64 and 66 is provided with vertical bores 74 and 76 respectively formed in alignment with one another and receiving similar tool holders 78 and 80. These are in the form of headed cylinders (Figure 1) clamped in their respective bores 74 or 76 and having oppositely-inclined slots 82 and 84 therein for receiving lower and upper cutting tool bits 86 and 88 respectively also oppositely-inclined (Figures 1 and 8). The lower ram 64 is provided adjacent each tool holder 78 with a vertical hole 90 forming a chip chute.

The upper cutting ram 66 is shorter than the lower one 64 and at its rearward end is slotted or forked as at 92 to provide a slot and bored transversely to receive a pivot pin 94 extending across the slot 92. Pivotally mounted on the pivot pin 94 is the forward end of a link 96, the rearward end of which is pivotally mounted upon a pivot pin 98 mounted between ears 100 suitably bored to receive it, these ears extending upward from the central portion of a cross head 102. The central portion of the cross head 102 (Figure 2) is notched as at 104 to receive the upper portion of the lower cutting ram 64, and is bolted thereto as at 106.

The opposite ends of the cross head 102 are bored as at 108 to receive the rearward ends of hydraulic piston rods 110 (Figure 3) held in place by nuts 112 and carrying piston heads 114 reciprocable within spaced parallel hydraulic cylinders 116, the rearward ends of which are closed by end caps 118 threaded thereon. The forward ends of the hydraulic cylinders 116 are threaded into sockets 120 in block-shaped end caps 122 which in turn are bolted or otherwise secured to the outer side walls 42 of the intermediate supporting structure 26. The end caps 118 and 120 are provided with fluid ports or connections 124 and 126 respectively for connection of a hydraulic circuit including a hydraulic pump and a suitable four-way valve. Such circuits are well-known among mechanical engineers and hence require no detailed description. As a consequence, when pressure fluid is supplied to one of the ports 124 or 126 and the other is arranged to discharge fluid, the piston 114 reciprocates to and fro, causing the cutting tool bits 86 and 88 to pare off the flash F at the seam S of the workpiece or open-centered article A, as described in connection with the operation of the invention.

Clamping mechanism

Bolted as at 130 to the upper portions of the guide bars or wear members 72 (Figures 3 and 6) are spaced parallel lower clamping jaws 132 having arcuate concave upper work-engaging surfaces 134 corresponding in curvature to the curvature of the article or workpiece A. Bolted or otherwise secured to the intermediate structure 26 at the rearward ends of the jaws 132 is a workpiece stop bar 135. Cooperating with the lower jaws 132 and disposed thereabove are upper clamping jaws 136 which are bolted as at 138 to the head structure 70 on the bottom side thereof in spaced parallel relationship and which also have arcuate convex lower work-engaging surfaces 140. The lower and upper jaws 132 and 136 are spaced laterally apart from one another a sufficient distance to permit unimpeded motion of the cutting tools 86 and 88 and their respective holders 78 and 80.

The head structure 70 is provided with pairs of vertical bores 142 and 144 at or near its four corners to receive the reduced diameter upper end portions 146 of strain rods 148 and 149 which are reciprocable in similarly arranged pairs of vertical bores 150 and 152 located in the intermediate supporting structure 26. The upper ends of the strain rods 148 and 149 are secured by the nuts 154 and 156 to the head 70 whereas their lower ends carry forward and rearward pairs of rack sleeves 158 and 160 respectively (Figure 7) provided on their sides with rack teeth 162 and 164 respectively. The lower ends of the strain rods 148 are reduced in diameter as at 166 to pass through the ends of a suitably bored cross head 168 and secured thereto as by the nuts 170 threaded thereon.

The cross head 168 is provided with a vertical central bore 172 in which the lower end of a piston rod 174 is pinned or otherwise suitably secured. The upper end of the piston rod 174 carries a piston 176 which is reciprocable within a hydraulic cylinder 178, the lower end of which is closed by a cylinder head 180 bored for the passage of the piston rod 174. The upper end of the cylinder 178 is closed by the top wall 22 of the base structure 12 (Figure 5) to which it is secured, as by the flange 182. Pressure fluid is supplied at the connections 181 and 183 to the opposite ends of the hydraulic cylinder 178.

Meshing with the rack teeth 162 on the forward rack sleeve 158 are the arcuate teeth 184 on one end of a pair of forward rocking levers 186 having arcuate teeth 188 on their opposite ends meshing with arcuate teeth 190 on a pair of similar rearward rocking levers 192 (Figure 1) having rearward arcuate teeth 194 meshing with the rack teeth 164 on the rearward rack sleeves 160. The forward and rearward rocking levers 186 and 192 are mounted respectively on forward and rearward pivot shafts 196 and 198 mounted respectively in bifurcated bearing brackets 200 and 202 bolted to the underside of the bottom wall 50 of the intermediate structure 26. The rack sleeves 158 and 160 together with the levers 186, 192, their pivot shafts 196, 198 and bearing brackets 200, 202 collectively constitute a motion-transmitting and equalizing mechanism, generally designated 204 (Figures 1 and 7).

Operation

In the operation of the invention, to load the machine with a workpiece, the hydraulic cylinder 178 is supplied with pressure fluid through the lower connection 181 thereof, causing the piston 176 and the piston rod 174 to rise, fluid being discharged through the connection 183, as controlled by a conventional four-way valve or reversible hydraulic pump. This action carries the cross head 168 and forward strain rods 148 upward, lifting the head 70. At the same time, the consequent upward motion of the rack sleeve 158 rocks the levers 186 and 192 in opposite directions around their pivot shafts 196 and 198 (Figure 1), transmitting motion in the same direction and by the same amount to the rack sleeve 160, it being assumed, of course, that the equalizing mechanism 204 is arranged in one-to-one ratio. As a consequence, the rearward strain rods 149 also move upwardly at the same rate as the forward strain rods 148, resulting in a simultaneous equal lifting of the forward and rearward ends of the head 70 and a consequent lifting of the upper clamping jaws 136 secured to the forward extension 71 of the head 70. This action creates a space between the upper and lower clamping jaws 132 and 136 and upper and lower cutting tools 88 and 86 of the upper and lower cutting rams 66 and 64, into which space the operator inserts an open-centered welded sheet metal workpiece or article A with the flash F at the welded seam S thereof aligned with the paths of travel of the cutting tools 88 and 86 (Figures 1, 4 and 6).

The operator now shifts the flow of pressure fluid from the lower connection 181 to the upper connection 183 of the hydraulic clamping cylinder 178, causing the piston 176, piston rod 174, cross head 168, strain rods 148 and 149, head 70, head extension 71 and upper clamping jaws 136 to move downward into engagement with the article A, clamping it firmly against the lower clamping jaws 132 (Figure 6). At the same time, fluid is of course discharged from the lower connection 181 of the hydraulic clamping cylinder 178.

Pressure fluid is now supplied to the connections or ports 126 at the forward ends of the hydraulic cylinders 116 (Figure 3), causing the pistons 114 and their piston rods 110 to reciprocate rearwardly, carrying with them the cross-head 102. At the same time, fluid is discharged from the rearward ports or connections 124, with the aid of a conventional four-way valve connected to a conventional hydraulic pump, or by the use of a conventional reversible hydraulic pump. This motion of the cross-head 102 is transmitted directly to the lower cutting ram 64 by the cross-head 102, and by the link 96 (Figure 1) to the upper cutting ram 66, retracting both cutting rams and drawing their cutting tools 86, 88 along the seam S of the article A, removing the flash F therefrom.

The operator now resupplies pressure fluid to the lower connection 181 of the hydraulic clamping cylinder 178, raising the clamping head extension 71 and upper clamping jaws 136 in the manner previously described, releasing the clamping grip thereof upon the article A, which is then removed. The operator then supplies pressure fluid to the rearward connections or ports 124 of the hydraulic cylinders 116, causing the pistons 114, piston rods 110, cross head 100, and upper and lower cutting rams 66 and 64 again to move forward to their forward positions shown in Figure 1, ready to receive and remove the flash from the next article A, which is inserted therebetween and treated in the manner described above.

For most efficient operation, it is preferred that the flash F be removed in successive stages of the reciprocation of the cutting rams 66 and 64, as by setting the upper and lower cutting tools 88 and 86 in the stepped arrangement shown in Figure 8. In this manner, the work of removing the flash F is divided between the cutting tools so that one pair removes a portion of the flash and the next following pair another portion. It will be obvious that the work of removing the flash may be divided between any number of pairs of upper and lower cutting tools 88 and 86, two pairs thereof being shown for simplicity and convenience.

In view of the fact that the seams S of the articles A occupy the same positions in the welding machine, the flash-removing machine 10 of the present invention, and in subsequent apparatus, the machine 10 of the present invention enables the articles to be moved or conveyed either manually or automatically from machine to machine without the necessity of changing the orientation thereof, and enabling the seams S of the articles A to be kept in registry with the same corresponding position in each machine. Thus, the flash-removing machine 10 of the present invention effects a great saving of labor and expense hitherto required in the repositioning operations necessitated in prior flash-removing machines and enables the conversion of previously manual conveying and positioning operations into automatic or semi-automatic operations.

What I claim is:

1. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, mechanism for reciprocating said upper and lower cutting units and cutting tools, and mechanism for selectively raising and lowering said upper clamping structure and upper clamping device relatively to said lower clamping device, said raising and lowering mechanism including spaced vertically-directed parallel members connected at spaced locations to said upper clamping structure, a motor reciprocably connected to one of said parallel members, and motion-transmitting equalizing mechanism operatively interconnecting said members, said motion-transmitting and equalizing mechanism including a pair of rocking levers pivotally mounted end to end, said levers having their adjacent ends operatively engaging one another and their remote ends operatively engaging said spaced parallel members.

2. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, mechanism for reciprocating said upper and lower cutting units and cutting tools, and mechanism for selectively raising and lowering said upper clamping structure and upper clamping device relatively to said lower clamping device, said raising and lowering mechanism including spaced vertically-directed parallel members connected at spaced locations to said upper clamping structure, a motor reciprocably connected to one of said parallel members, and motion-transmitting equalizing mechanism operatively interconnecting said members, said motion-transmitting and equalizing mechanism including a pair of rocking levers pivotally mounted end to end, said levers having arcuately-toothed opposite ends and said parallel members having toothed portions, said levers having their adjacent ends meshing with one another and their remote ends meshing with the toothed portions of said spaced parallel members.

3. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, a connecting link disposed substantially parallel to said upper and lower cutting units and operatively interconnecting said cutting units, mechanism including a reciprocatory fluid pressure motor operatively connected to one of said cutting units and connected through said link to the other cutting unit for reciprocating said upper and lower cutting units and cutting tools, and mechanism for selectively raising and lowering said upper clamping structure and upper clamping device relatively to said lower clamping device.

4. A flash trimming machine for open-centered continuous-rimmed workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, said upper and lower clamping devices and said upper and lower cutting units and the portions of said frame structure and upper clamping structure adjacent thereto respectively having forwardly-projecting outer ends spaced vertically apart from one another with a forwardly-open workpiece-receiving space therebetween, mechanism for reciprocating said upper and lower cutting units and cutting tools, and mechanism for selectively raising and lowering said upper clamping structure and upper clamping device relatively to said lower clamping device, said lower clamping device having an upwardly-directed concave workpiece-engaging surface and said upper clamping device having a downwardly-directed convex workpiece-engaging surface whereby to clamp said open-centered workpiece in an upstanding position on said concave workpiece-engaging surface.

5. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, mechanism for reciprocating said upper and lower cutting units and cutting tools, and mechanism for selectively raising and lowering said upper clamping structure and upper clamping device relatively to said lower clamping device, said raising and lowering mechanism including two pairs of spaced vertically-directed parallel members connected at spaced locations to said upper clamping structure, a cross head interconnecting one pair of said parallel members, a reciprocatory fluid pressure motor reciprocably connected to said cross head, and motion-transmitting equalizing mechanism operatively interconnecting said members.

6. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, mechanism including a horizontally-reciprocable fluid pressure motor for reciprocating said upper and lower cutting units and cutting tools, and mechanism for selectively raising and lowering said upper clamping structure and upper clamping device relatively to said lower clamping device, said raising and lowering mechanism including two pairs of spaced vertically-directed parallel members connected at spaced locations to said upper clamping structure, a cross head interconnecting one pair of said parallel members, a vertically reciprocable fluid pressure motor reciprocably connected to said cross head, and motion-transmitting equalizing mechanism operatively interconnecting said members.

7. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, a connecting link disposed substantially parallel to said upper and lower cutting units and pivotally connected at its opposite ends to said upper and lower cutting units respectively, mechanism for reciprocating said upper and lower cutting units and cutting tools, and mechanism for selectively raising and lowering said upper clamping structure and upper clamping device relatively to said lower clamping device.

8. A flash trimming machine for open-centered workpieces comprising a frame structure, a lower clamping device stationarily mounted on said frame structure, an upper clamping structure movably mounted on said frame structure above said lower clamping device for upward motion relatively thereto, an upper clamping device mounted on said upper clamping structure, a lower cutting unit reciprocably mounted on said frame structure beneath said lower clamping device and having a lower cutting tool thereon, an upper cutting unit reciprocably mounted on said upper clamping structure above said lower cutting unit and having an upper cutting tool thereon, a laterally-extending cross head connected to one of said cutting units, a connecting link disposed substantially parallel to said upper and lower cutting units and pivotally connected at one end to the other cutting unit and at its other end to said cross head, mechanism for reciprocating said upper and lower cutting units and cutting tools, and mechanism including a pair of laterally-spaced horizontally-reciprocable fluid pressure motors connected respectively to the opposite ends of said cross head.

References Cited in the file of this patent
UNITED STATES PATENTS

| | | |
|---|---|---|
| 1,117,663 | Gressle | Nov. 17, 1914 |
| 1,854,522 | Morton | Apr. 19, 1932 |
| 1,995,104 | Morton | Mar. 19, 1935 |
| 2,143,969 | Biggert | Jan. 17, 1939 |
| 2,283,507 | Morton | May 19, 1942 |
| 2,580,817 | Morton | Jan. 1, 1952 |